Figure 1:
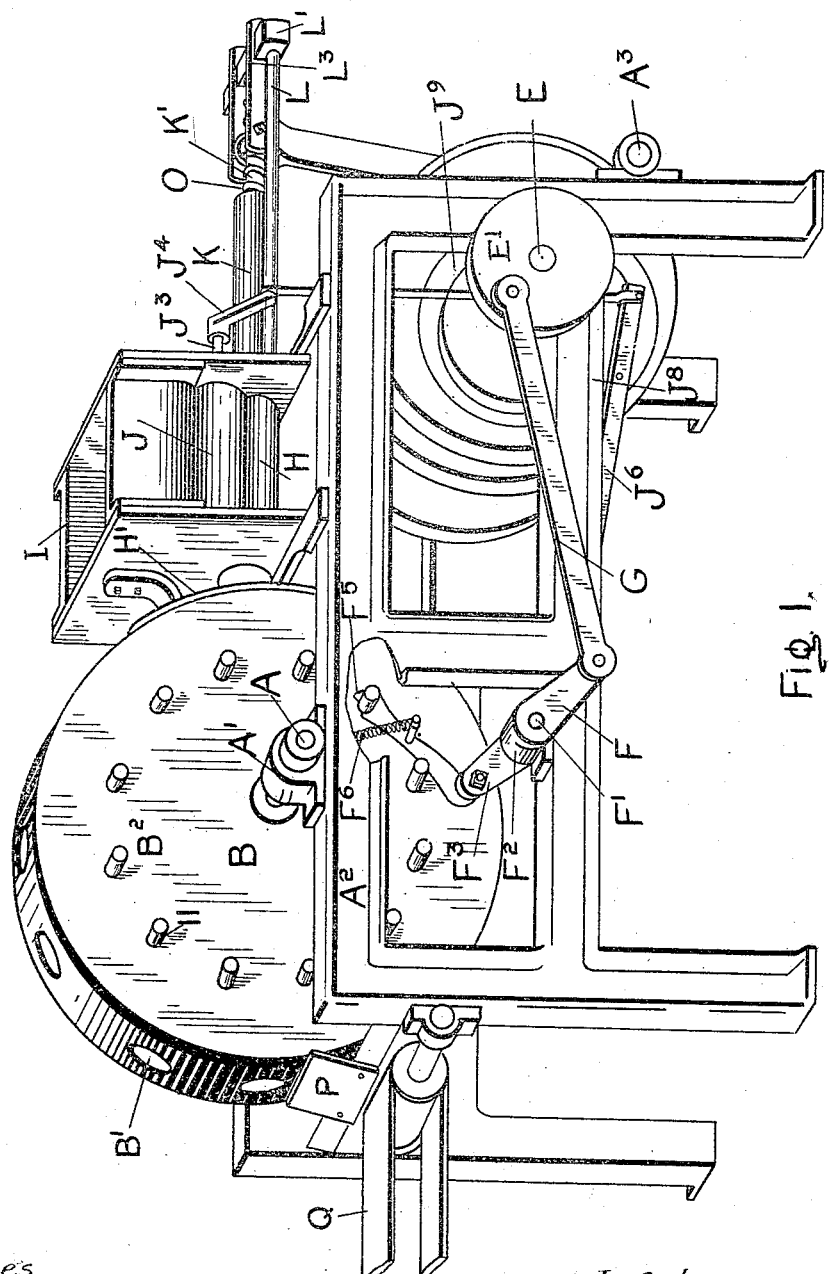

No. 873,682. PATENTED DEC. 10, 1907.
G. T. PENDRITH.
DOUGH DIVIDING MACHINE FOR BREAD MAKING.
APPLICATION FILED NOV. 27, 1906.

4 SHEETS—SHEET 1.

Witnesses,
H. Young.
Y. Tauber,

Inventor.
G. T. Pendrith,
By Fred. B. Fetherstonhaugh
atty

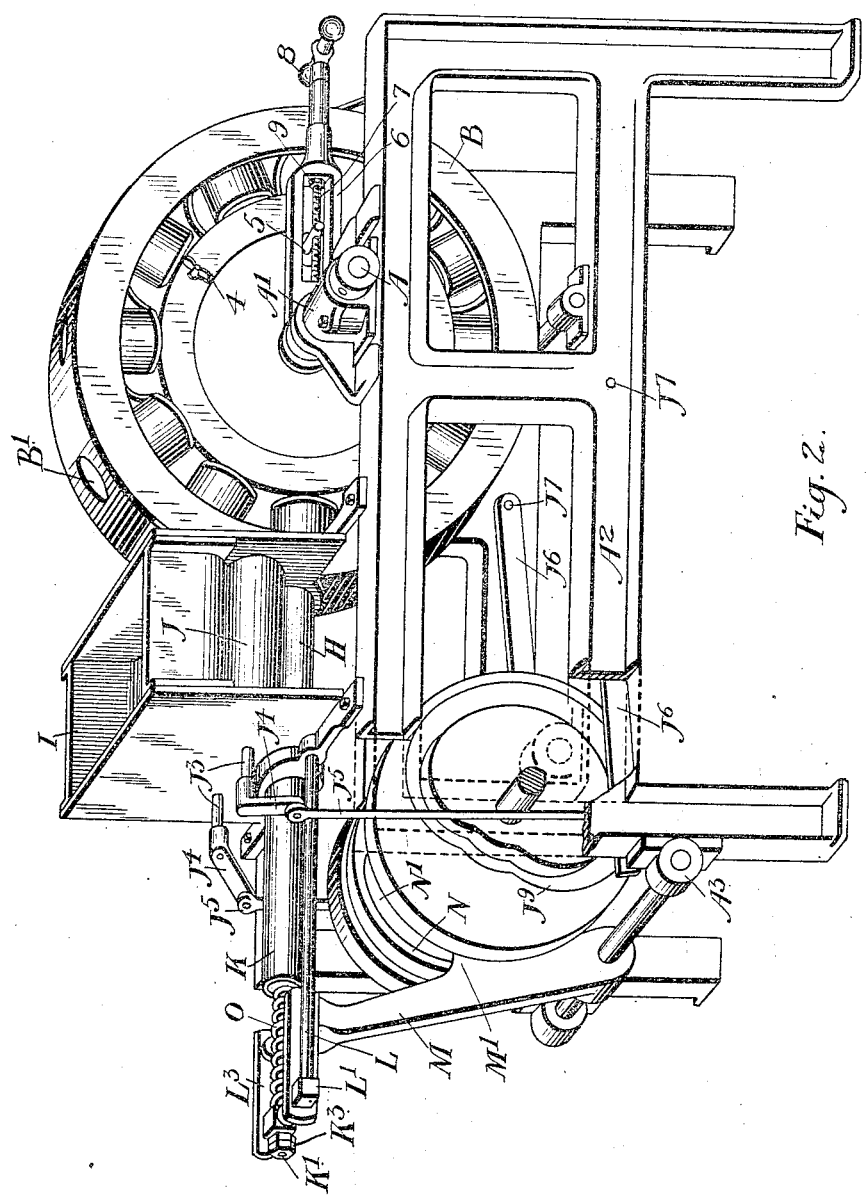

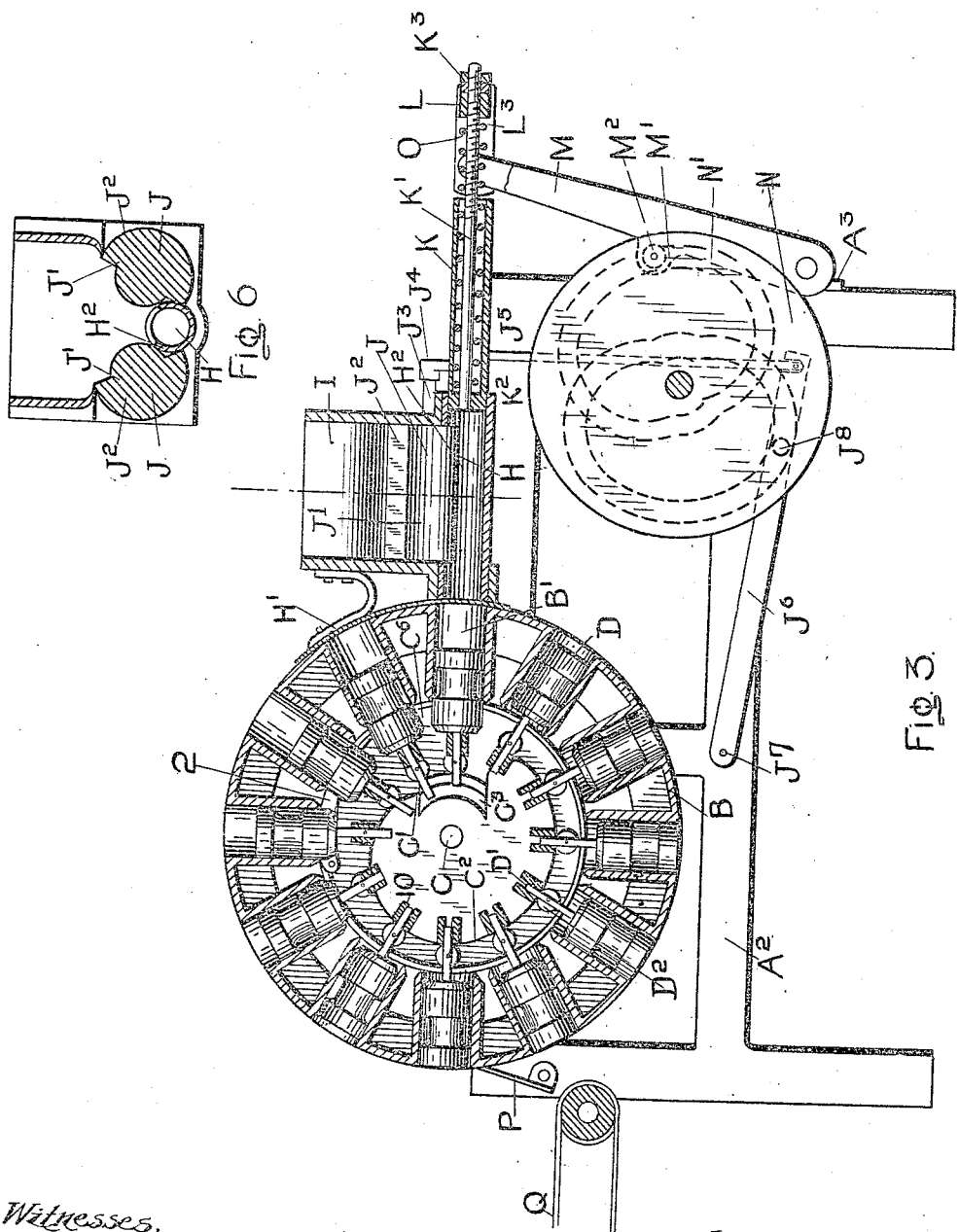

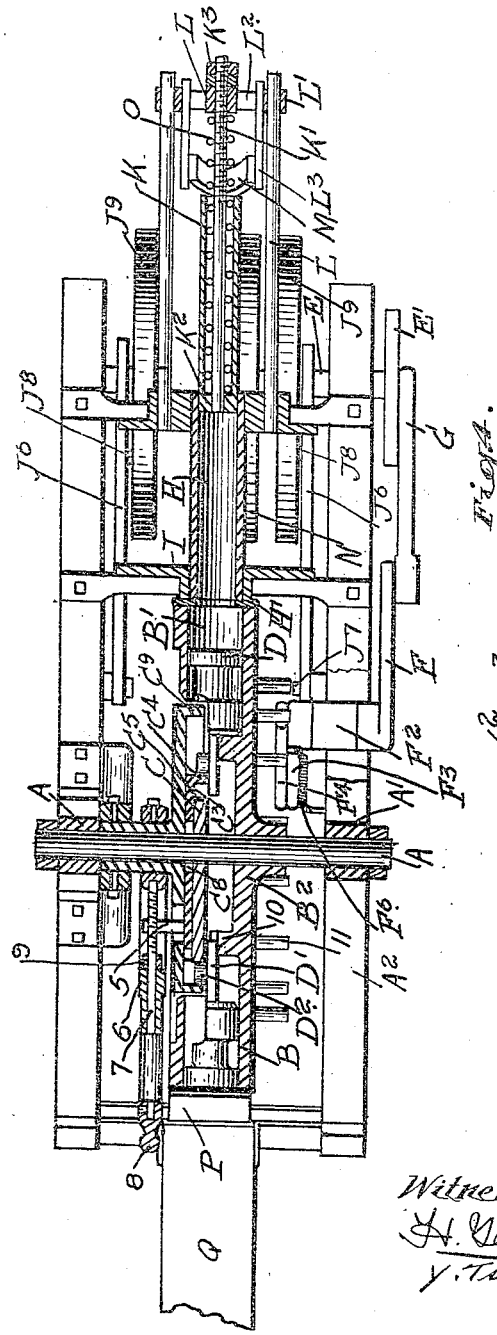

UNITED STATES PATENT OFFICE.

GEORGE THOMAS PENDRITH, OF TORONTO, ONTARIO, CANADA.

DOUGH-DIVIDING MACHINE FOR BREAD-MAKING.

No. 873,682.     Specification of Letters Patent.     Patented Dec. 10, 1907.

Application filed November 27, 1906. Serial No. 345,391.

*To all whom it may concern:*

Be it known that I, GEORGE THOMAS PENDRITH, of the city of Toronto, in the county of York, in the Province of Ontario, Canada, have invented certain new and useful Improvements in Dough-Dividing Machines for Bread-Making, of which the following is the specification.

My invention relates to improvements in dough dividing machines for bread making, and the object of the invention is to devise a simple, cheap and compact machine of a maximum capacity for a given size of machine, and such a machine as will be capable of ready adjustment according to the variation in the bulk of the dough during the period that the machine is running.

Further objects are to make a machine that can be readily cleaned, in which all heavy weights will be dispensed with, which will have a positive even motion, in which there will be no loss of time or motion in its operation, in which the loaves will be made separately and consequently no separation necessary as in various classes of machines at present in use where more than one loaf is turned out at a time.

A still further object is to make a machine in which the loaves may be delivered to the molding machine or kneading up machine without manual labor.

To carry out these objects I have constructed my machine with a central drum suitably mounted on a shaft and carrying a series of molds, a stationary cam located on the shaft and plungers operatively connected to the cam and located in the molds, a suitable feed hopper and plunger for the delivery of the dough to the molds of the drum as they rotate, means for imparting a step-by-step movement to the drum and means for cutting off the feed and operating the plunger after the feed is cut off, such as the cams and mechanism connected therewith, which is shown and described more particularly hereafter.

Figure 1, is a perspective view of my dough dividing machine from the side in which the step-by-step movement is given to the drum. Fig. 2, is a perspective view of the machine from the opposite side. Fig. 3, is a longitudinal section through the machine. Fig. 4, is a sectional plan. Fig. 5, is a detail of the cam. Fig. 6, is a cross section of the hopper.

In the drawings like letters of reference indicate corresponding parts in each figure.

A is the main shaft of the machine, which is journaled in suitable bearings $A^1$ on the frame $A^2$, and B is the drum, which is rigidly mounted on the shaft. $B^1$ are a series of radially arranged molds attached to or forming part of the drum B, being preferably cast integral therewith.

D are plungers arranged one in each mold and C is a cam secured rigidly on the frame $A^2$ and loosely mounted on the shaft and arranged from $C^1$ to $C^2$ with a gradually increasing radius.

$C^3$ is a plate having a concentric end rib $C^4$ projecting through a slot $C^5$ in the disk $C^6$ to which the cam C is secured. The cam C has a recess $C^7$ having a concentric bottom. The plate $C^3$ is provided with a slot $C^8$ (see dotted lines in Fig. 5 and full lines in Fig. 4) whereby it may be adjusted so that the rib $C^4$ may be brought nearer or farther from the concentric side of the recess $C^7$. The disk $C^6$ is provided with a rim $C^9$ having portion of its periphery cut away to receive a gate 2, which is pivoted at one end and provided near the opposite end with a pin 3 designed to extend through a slot 4 concentric to the pivot pin of the gate. By means of the head of the pin 3 on the opposite side to that shown in Fig. 5, the gate may be adjusted inwardly for a purpose which will hereinafter appear.

5 is a pin extending outwardly from the opposite side of the plate $C^3$ and 6 is a slotted arm journaled at one end on the hub of the disk $C^6$.

7 is a screw spindle extending through the slotted arm and provided with a turning handle 8 at the outer end and having the inner end screw threaded as indicated in Figs. 2 and 4. A nut 9 is located at the outer end of the slot and thereby with the handle 8 allows the screw spindle being turned without longitudinal adjustment. The threaded end of the screw spindle extends through a corresponding hole in the pin 5 and it will thus be seen that as the pin 5 is secured to the plate $C^3$, that the turning of the screw spindle will effect the longitudinal adjustment of the concentric rib $C^4$ for the purpose of adjusting the movement of the plungers D at the point where they receive the dough as will hereinafter appear. The plungers D are provided with radially extending rods $D^1$ on which are journaled the rollers $D^2$. The rods are guided in their radial movement by means of guides 10 concentrically arranged and attached to or forming part of the face B² of the drum. Located on the opposite side of the face B² of the drum are a series of pins 11 corresponding in number to the plungers and equally spaced concentrically. E is a counter shaft suitably journaled in the frame and carrying the crank wheel E¹ at one end.

F is an arm secured on a suitable stud F¹ journaled in the bearing F² secured to the frame. The arm F is connected by the pitman G to the crank wheel E¹. F³ is an arm secured at the opposite end of the stud F¹ and F⁴ is a push arm pivotally secured in the end of the arm F³ and having a notched end F⁵ engaging with one of the pins 11. Such notched end F⁵ of the push bar F⁴ is held in engagement by a spring F⁶. By means of the crank wheel E¹, it will, therefore, be seen that by the mechanism hereinbefore immediately described the drum is given a step-by-step movement corresponding circumferentially to the distance between center and center of each mold and so arranged as to bring the mold opposite to the bottom of the tube H of the hopper I. It will be noticed that such bottom tube of the hopper I has a flange H¹ concentric to the drum and fitting closely to it past the first succeeding mold in the direction of rotation. The tube H has also a top opening H² in which the dough is deposited.

J J are segmental rollers having the concentric portion J¹ of a less radius than the concentric portion J², the ends connecting the two portions being substantially diametrically opposite each other (see Fig. 6). The rollers J are journaled in bearings in the ends of the hopper and the spindles J³ of the rollers have located at their outer ends the arms J⁴, which are connected by the rods J⁵ to the arms J⁶ pivoted at one end on the pins J⁷ and carrying the rollers J⁸.

J⁹ are cams having grooves into which the rollers extend. The grooves of the cams are so shaped as to give an oscillating movement to the rollers J at the top towards and from each other. This oscillating movement is to cut off the supply of dough immediately the plunger starts to move forward and as soon as the plunger moves backwardly again into the position shown in the drawing the rollers are opened up again in order to allow the dough to feed. The cam groove is arranged with a concentric portion, so that the rollers remain stationary during the period that the plunger feeding the dough is being moved backward and forward.

K is a plunger, which is hollow as shown and has a central rod K¹ extending therethrough into the solid inner end K².

L are rods, which are secured at one end in the ends of the hopper I and at the opposite end extend through the cross bars L¹. The cross bars L¹ have a round portion L² on which are swung the links L³ to which the upper ends of the forked lever M are connected. The lower end of the forked lever is pivoted on a bracket A³ on the frame. Intermediate of the length of the forked bracket M² I provide an offset M¹, which carries a roller M², which works in a groove N¹ of the cam N. Such cam groove N¹ in connection with the lever M imparts the requisite reciprocating movement to the plunger K, a portion of the cam being concentric, so that the plunger will remain stationary during the period that the dough is being fed. I provide a spring O extending between the inner end of the plunger and the cross bar L¹ in order to make the plunger of a yielding resilient nature. The degree of yield or resiliency may be determined by adjusting up the nuts K³ at the outer threaded end of the rod K¹.

Having now described the principal parts involved in my invention I shall briefly describe its operation and utility.

The dough is fed into the hopper I and is carried down by the segmental rollers J into the hollow tube H. The plunger K is then caused to move forward, so as to cause the dough to move inwardly into the mold. Immediately the dough has been projected into the mold the drum is given a step-by-step movement to carry it around and the next succeeding mold into position. During the same time the plunger is carried backwardly again and when it has reached the limit of its backward stroke, the mold is opened up by the segmental rollers J and further dough is deposited into the tube H preparatory to being again projected into the next succeeding mold. This operation is repeated continuously as the drum continues to revolve. The bulk of the loaf is determined to a nicety by the adjustment of the concentric rib C⁴ of the cam C by the means hereinbefore described, thereby determining what position the plunger assumes in the mold. The dough is ejected on the side of the drum diametrically opposite the mold into which it is first projected and such ejection is aided by means of the scraper P suitably held in the frame and resting against the periphery of the drum. The loaf as it is freed from the drum is carried away by means of the endless band Q to the molding machine, or to a kneading up machine.

In order to cleanse the molds and plungers it is necessary to remove the plungers and to effect this I provide the gate 2 hereinbefore described, which may be thrown inwardly so that as the drum rotates the rollers will pass outside of the gate and may be readily withdrawn for cleansing purposes.

What I claim as my invention is:

1. The combination with the drum and radially arranged molds, a cam, and a disk provided with a rib surrounding the cam, said rib having a gate therein to which disk the cam is affixed, of the plungers and rods and rollers co-acting with the cam as and for the purpose specified.

2. The combination with the drum and radially arranged molds, a cam, and a disk provided with a rib surrounding the cam and having a removable portion and to which disk the cam is affixed, of the plungers and rods and rollers co-acting with the cam, and guides on the inner face of the drum for the rods as and for the purpose specified.

3. The combination with the drum and radially arranged molds, a cam, and a disk provided with a rib to which disk the cam is affixed, of a gate forming part of said rib, a pin connected to the gate and projecting through the disk for moving the gate, plungers and rods and rollers co-acting with the cam, and means for varying the position of the plungers in the mold at the point of feed of the dough as and for the purpose specified.

4. The combination with the drum and radially arranged molds, a cam, and a disk provided with a rib to which disk the cam is affixed, of the plungers and rods and rollers co-acting with the cam, a slot or opening in the disk, a plate provided with a concentric rib extending through the recess opposite the concentric portion of the cam or inner side of the recess, and means for adjusting such plate as and for the purpose specified.

5. The combination with the drum and radially arranged molds, a cam, and a disk provided with a rib to which disk the cam is affixed, of the plungers and rods and rollers co-acting with the cam, a slot or opening in the disk, a plate provided with a concentric rib extending through the recess opposite the concentric portion of the cam or inner side of the recess, a pin extending through a slot in the disk and secured in the plate aforesaid, a slotted arm provided with a central rod suitably held from longitudinal displacement and having a threaded end extending through the pin aforesaid as and for the purpose specified.

6. The combination with the drum and molds and plungers, of the hopper provided with a tubular bottom having an open top and a hollow plunger having a closed end, a rod extending through the plunger at one end and through a cross bar at the opposite end, rods held in the end of the hopper and in the cross bar, links swung on the end of the cross bar, a lever journaled in the frame provided with a forked end and at the upper end connected to the links, a roller on the lever, a counter shaft, a cam on such counter shaft in the groove of which such roller extends as and for the purpose specified.

7. The combination with the drum and molds and plungers and hopper having a tubular bottom, of a hollow plunger provided with a closed end, side rods held in the ends of the hopper, a cross bar held on the outer end of the side rods, a center rod extending through the plunger and provided with a threaded outer end and nuts on the outer end of the rod outside of the cross bar and a spiral spring encircling the central rod and extending between the inner end of the plunger and the cross bar as and for the purpose specified.

GEORGE THOMAS PENDRITH.

Witnesses:
B. BYD,
E. McEACHERN.